United States Patent
Gódor et al.

(10) Patent No.: US 8,125,903 B2
(45) Date of Patent: Feb. 28, 2012

(54) WIRELESS MULTICAST FOR LAYERED MEDIA

(75) Inventors: István Gódor, Budapest (HU); Ákos Kovács, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 618 days.

(21) Appl. No.: 12/300,474

(22) PCT Filed: May 16, 2006

(86) PCT No.: PCT/EP2006/004563
§ 371 (c)(1),
(2), (4) Date: Nov. 12, 2008

(87) PCT Pub. No.: WO2007/131527
PCT Pub. Date: Nov. 22, 2007

(65) Prior Publication Data
US 2009/0161593 A1 Jun. 25, 2009

(51) Int. Cl.
*H04J 1/16* (2006.01)
(52) U.S. Cl. ............. 370/230.1; 370/252; 370/395.53
(58) Field of Classification Search .......... 370/229, 370/230, 230.1, 232, 233, 234, 431, 432, 370/351, 389, 395.1, 395.5, 395.53, 241, 370/252
See application file for complete search history.

(56) References Cited

U.S. PATENT DOCUMENTS

| | | | |
|---|---|---|---|
| 2003/0135863 A1 | 7/2003 | Van Der Schaar | |
| 2003/0156540 A1* | 8/2003 | Trossen et al. | 370/232 |
| 2004/0168051 A1* | 8/2004 | Guo et al. | 713/153 |
| 2005/0108421 A1* | 5/2005 | Xu et al. | 709/233 |
| 2005/0259623 A1* | 11/2005 | Garudadri et al. | 370/335 |
| 2006/0040707 A1* | 2/2006 | Kish et al. | 455/562.1 |

FOREIGN PATENT DOCUMENTS
EP 1 320 216 A 6/2003

OTHER PUBLICATIONS

Brett J Vickers et al: "Source-Adaptive Multilayered Multicast Algorithms for Real-Time Video Distribution" IEEE/ACM Transactions on Networking, IEEE/ACM, New York, NY, US, vol. 8. No. 6, Dec. 2000, XP011038900 ISSN: 1063-6692 Abstract Paragraphs [0001]—[0003].

Jiangchuan Liu et al: "On the optimal rate allocation for layered video multicast" Computer Communications and Networks 2001. Proceedings. Tenth International Conference on Oct. 15-17, 2001, Piscataway, NJ, USA, IEEE, Oct. 15, 2001, pp. 412-417, XP010562125 ISBN: 0-7803-7128-3 Paragraphs [0001], [0002].

Oouchi H et al: "Multi-Rate Control Method Using Layered Content" Applications and the Internet, 2005, Proceedings, The 2005 Symposium on Trento, Italy 31-04, Jan. 2005,Piscataway, NJ, USA, IEEE, Jan. 31, 2005, pp. 311-317, XP010765774 ISBN: 0-7695-2262-9 Abstract Paragraph [0001].

* cited by examiner

*Primary Examiner* — Kwang B Yao
*Assistant Examiner* — Obaidul Huq (57) ABSTRACT

A method and arrangement in a wireless communication network for optimizing data rates when communicating layered multicast data. In an initial probing phase, the receiving capability of each user equipment (UE) in each cell is collected. The optimal data rate for each layer is then calculated and packets are transmitted to the UEs at the optimal rates. The UEs may periodically send updated receiving capabilities so that the optimal data rates can be updated. Additionally, the network may periodically obtain the updated receiving capabilities through secondary probing at unused data rates.

17 Claims, 6 Drawing Sheets

WIRELESS MULTICAST FOR LAYERED MEDIA

TECHNICAL FIELD

The present invention relates to wireless communication and in particular to an optimization of radio resources in a layered media environment.

BACKGROUND OF THE INVENTION

The user perceived quality is based on the receiving capabilities of the users (number of layers) and the quality properties of the layered media. The layered media to be multicast typically consists of one base layer and some enhancement layers each providing progressive quality improvement. There are available codec's (like Advanced Audio Coding—Bit-Sliced Arithmetic Coding (AAC-BSAC) for audio and H.264/MPEG-4 AVC for video) providing such a media stream.

In the wireless access network, different data rates (e.g. provided by different modulations) are available for the Access Point (AP) and the AP can change the applied data rate per packet. For example WLAN 802.11b networks have this feature. However, this feature is not used in case of multicasting.

From the adaptiveness point of view three multicasting schemes are used today:
- Single stream adaptive approach: the highest possible quality, but the same quality is sent to all users according to their receiving capabilities.
- Replicated stream approach: different quality versions of the media are sent to the users according to their receiving capabilities.
- Layered stream approach: different layers of the media are sent out to different multicast groups, the user can decide to which group he/she wants to sign up.

All the above approaches are available today in wireline networks. However, only the Single stream adaptive approach is used in wireless networks. In the typical realization, the media is transmitted at a fixed data rate, mostly at the lowest. The realization of this approach is referred to as Single Rate later on.

The Replicated and the Layered approaches require additional information like the receiving capability of the users. However, this capability information is not used today in case of multicasting if it is available at all. In WLAN networks, for example, there is no protocol to report this information. A possible realization of the Replicated approach is referred to as Replicated Rate later on.

In the Layered approach, the data packets have to carry information about which layer they correspond to. The solution used today in wireline environment is to distribute each layer on a separate multicast group, however, it cannot be applied in wireless networks, since the continuously changing radio environment would cause continuous subscription and leave of these groups. An applicable solution can be to provide the layer information, for example, by cross-layer information forwarding techniques like the LID concept, using the Differentiated Services CodePoint, or other appropriate fields in packet headers. In that case, all layers of a media can be distributed in the same multicast group.

Figure 1:
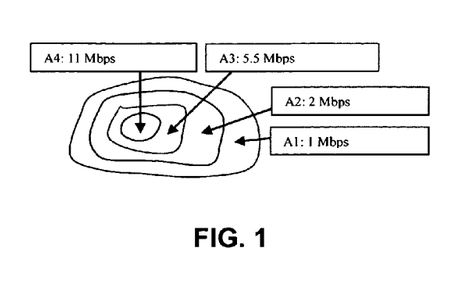
FIG. 1 illustrates schematically nested data rates in the areas of WLAN 802.11b networks.

Moreover, in order to utilize the advantages of the Layered approach and provide better solutions than the Replicated approach, the available data rates should be nested. Namely, if a higher data rate is available in an area, then all lower data rates are also available. See FIG. 1 for illustration in case of WLAN 802.11b networks. Depending on range from the access point different bit rates can be applied and received in the radio interface. The further away from the AP the receiver is the less the bit rate will generally be. Many WLAN systems have a solution for decreasing the bit rate using a scheduled process until a suitable bit rate is established for a specific user. In FIG. 1 four different bit rate levels are indicated: 1, 2, 5.5 and 11 Mbps (Mega Bit per Second).

The above listed requirements set by the Layered approach are not satisfied today in wireless networks and the inherent capabilities to optimize the wireless multicast for layered media is not used.

In the Single Rate approach, the receiving capabilities of the users are not considered at all. Indeed, a conservative transmission policy is used that artificially keeps network utilization low. The Single Rate approach has the drawback that the media is usually sent at the lowest data rate even if all or most of the users could receive at higher data rates. The usage of higher data rates would result that a better quality version of the media could be sent during the same transmission time window available for this multicast media or network utilization could be improved.

The Replicated Rate technique can consider the receiving capabilities of the users. In this approach different quality versions of the media are transmitted at different data rates. Lower quality could be transmitted at lower data rates and higher quality could be transmitted at higher data rates. Because of this way of operation, however, this technique is resource consuming and bandwidth wasting, since it does not consider the layered structure of the media and the nested data rates of the network.

To sum up the problems, the existing solutions cannot provide differentiated quality to the users based on their receiving capabilities or require unnecessarily large amount of bandwidth. Today, the Layered approach can decrease the bandwidth usage only in the core networks (i.e. infrastructure networks); however, the bottleneck of the networks is in the wireless access part (i.e. the part that has direct communication with the user equipment).

SUMMARY OF THE INVENTION

It is an object of the present invention to remedy at least some of the problems with the existing technologies.

One object of the invention is to provide an optimized realization of the Layered approach in wireless networks and thus to maximize the user perceived quality while keeping resource consumption as low as possible.

For these reasons, a method for optimizing data rates in communicating multicast data is provided. The method comprises the steps of: obtaining available data rates corresponding to a user station; computing optimal data rate for at each access network cell; and controlling the data rate for each data packet at each access network cell. Most preferably, the multicast data is layered data. The method further comprises updating said available data rate to detect changes in the data rates in the network. The update is performed through a secondary collection of receiving capability of said user station. Preferably, obtaining available data rates comprises probing substantially all the data rates by transmitting a short packet train, detecting exact receiving capability by a user station, and replying by user stations a receiver capability message.

According to a preferred embodiment, a data rate is set using at least one of: defining a layer protocol, preferably a layer 2 protocol to carry the per-layer data rate tuple for each transmitted media or establishing a per-data rate tunnel, preferably a layer 2 VLAN (Virtual Local Area Network) tunnel. Thus, the protocol or tunnel is between at least one network cell and a gateway communicating with said network cell. Most preferably, each data rate is associated with a VLAN between the access point of the network cell and said gateway, and each tunnel transmits only packets, which should be sent out at a particular data rate associated with the tunnel and after calculating an optimal data rate for all media layers, the gateway associates packets to the proper VLAN.

The method may further comprise the steps of: collecting information about receiving capabilities of the users stations per network cell, computing an optimal data rate of media layers for each cell based on the receiving capabilities of the user stations and layer information of said media, and providing data rate said cells to use for a given packets based on the result of said optimization. The method may further comprise the steps of maximizing the average of a user perceived quality in a network by finding a data rate for each layer such that a user in an area with higher available data rates receives all information from lower data rates, so the number of received layers, R, is not less than the layers received in lower speed areas: $R_1 \leq R_2 \leq \ldots \leq R_D$, where D is the number of data rates in the network and a possible set of the data rates for each layer is calculated as a combination with repetition, where D elements are chosen from L possible ones, wherein L is number of layers of the media and one element is chosen several times.

Furthermore, a user perceived quality per data rate may be maximized by taking into account that most layers are sent in each data rate independently from the number of users receiving the given data rate by finding the maximal number of layers to be sent at each rate one after the other independently from the number of user receiving the individual data rates.

The invention also relates to a gateway arrangement for enabling multimedia communication over multimedia transport protocol and forwarding data to a user station. The arrangement comprises a receiving arrangement for receiving data packets, and a processing arrangement for sorting data packets into rate tunnels for optimal use of communication resources in a multicast environment. According to one preferred embodiment the arrangement comprises processing arrangement for calculating an optimal data rate for each layer of media and calculation comprises at least one of maximizing for average data rate within access network cell or maximizing per data rate per use within access network cell.

The gateway arrangement is arranged to receive a message containing information about available data rates for a user station, and most preferably the message is an Internet Group Management Protocol (IGMP).

The gateway arrangement is communicatively connected to a data storing arrangement with stored data rates available for each user. Preferably, the gateway arrangement comprises an arrangement for collecting information about the receiving capabilities of user stations per access point. The processing arrangement is arranged to compute an optimal data rate of media layers for each access point based on the receiving capabilities of said user stations and a layer information of the media. The gateway comprises transmission arrangement for sending to said access points a data rate to be used for a given packets based on a result of said calculation.

The invention further relates to media server for a layered media to be multicast comprising connection means to a gateway arrangement for enabling multimedia communication over multimedia transport protocol and forwarding data to a user station. The arrangement comprises a receiving arrangement for communicating data packets with said server, and a processing arrangement for sorting data packets into rate tunnels for optimal use of communication resources in a multicast environment.

The invention further relates to a router for routing a layered media to be multicast comprising connection means to a gateway arrangement for enabling multimedia communication over multimedia transport protocol and forwarding data to a user station. The router comprises a receiving arrangement for receiving and sending data packets to said arrangement comprising processing arrangement for sorting data packets into rate tunnels for optimal use of communication resources in a multicast environment.

Moreover, the invention concerns an access point for use in multicasting layered media comprising means for changing applied data rate per packet to a user station and device for connecting to a gateway arrangement for enabling multimedia communication over multimedia transport protocol and forwarding data to a user station. The arrangement comprises a receiving arrangement for receiving data packets, and transceiving data in rate tunnels.

The invention also relates to a communication device, comprising arrangement for receiving a layered media broadcasting comprising means for receiving an inquiry on its receiving capacity, means for generating a message about its available data rates and communication over multimedia transport protocol and receiving data packets in sorted data packets having rate tunnels.

The invention may be realized as an instruction set for execution in a gateway arrangement for enabling multimedia communication over multimedia transport protocol and forwarding data to a user station. The arrangement comprising a receiving arrangement for receiving data packets, and a processing arrangement for sorting data packets into rate tunnels for optimal use of communication resources in a multicast environment. The instruction set comprising: a first instruction set code for optimizing data rates in communicating multicast data, a second instruction set code obtaining available data rates corresponding to a user station; a third instruction set code computing optimal data rate within each access network cell; and a third instruction set code controlling the data rate for each data packet at each access network cell.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Briefly, the method of the invention incorporates knowledge about the receiving capabilities of the users and the quality properties of the layered media. The idea is a centralized optimization process in wireless access networks, where the Media Gateway collects the receiving capability information of the users, determines the optimal data rate for each layer and informs the AP's which data rate to use for each layer.

To achieve these requirements, following are provided in accordance with preferred embodiments:

a system with a protocol extension and a framework to obtain the information of the receiving capabilities of the users. I) A new IGMP message type or similar is provided to report the receiving capabilities of the users. II) Databases or registers are provided to store the receiving capabilities of the users and the media descriptor parameters. III) A method is provided for finding out the actual receiving capabilities of the users.

a method to inform the AP about which data rate should be applied for a given data packet. VLAN tunnels are provided to carry packets to be sent at the same data rate.

an algorithm for determining the proper data rate for each layer of the media.

Figure 2:
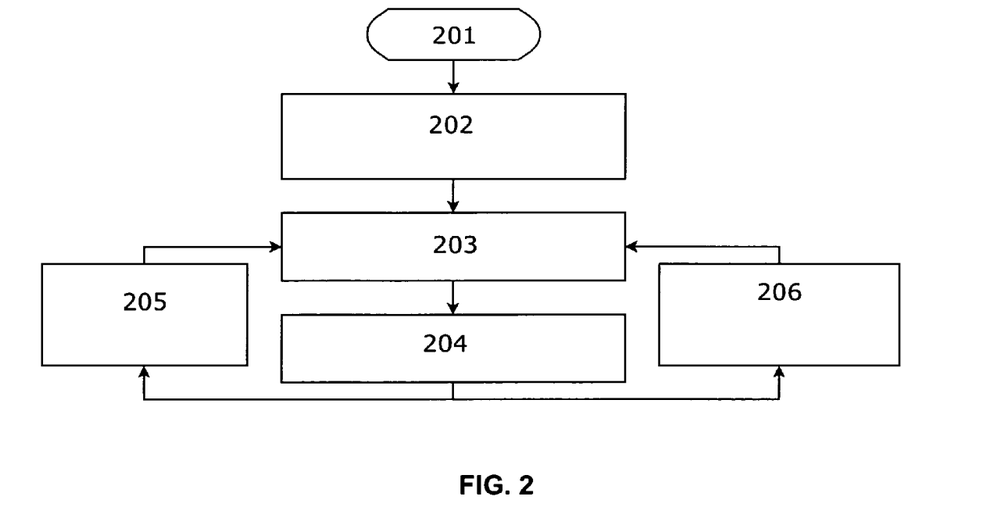
FIG. 2 illustrates schematically in a block diagram a method according to the present invention.
Figure 3A:
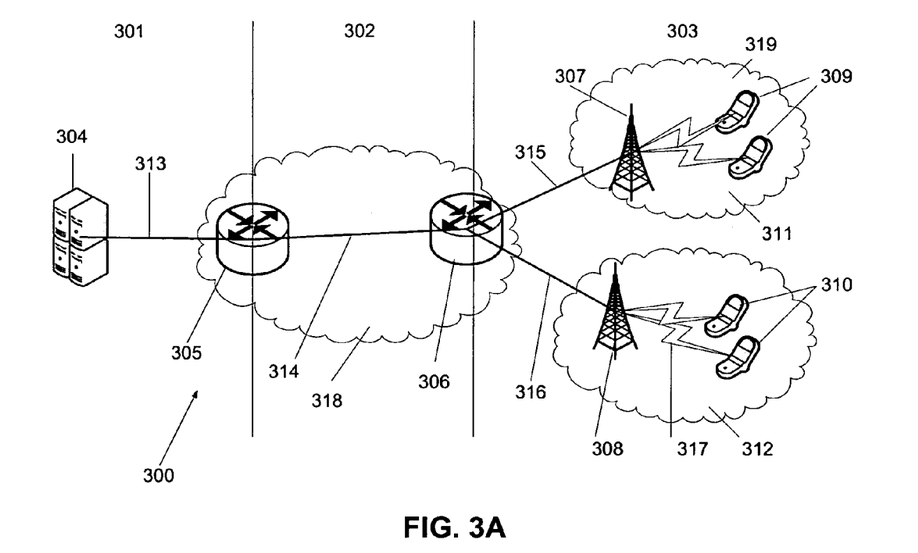
FIGS. 3A and B illustrate schematically a network architecture and communication for media delivery according to the present invention.

The building blocks of the proposed solution and system are illustrated schematically in FIGS. 2 and 3A. A layered media to be multicast can be provided 201 by a media server 304. Before starting the multicasting, the system collects the initial receiving capabilities of the users (initial probing phase 202), i.e. the user equipment. Then the system calculates 203 the optimal data rate for each layer of the multimedia and starts to send 204 the packets of the media at the optimal data rates. Since the receiving capabilities of the users can change in time, the users can update 205 their receiving capability information. Users 309, 310 can detect only those data rates which are in use; therefore, the system needs to perform periodically a secondary collection 206 of the receiving capabilities of the users 309, 310 if not all data rates are used (secondary probes). The solution may be summarized in the following steps:

201 providing layered media;
202 collecting initially information of receiving capability from user devices;
203 calculating the optimal data rate for each layer of the media;
204 sending packets of the media at the optimal data rates;
205 periodically receiving information of receiving capability sent by the users (User driven updates); and
206 periodically collecting information of receiving capability from the users obtained from secondary probing (secondary probe only at unused data rates).

The media server comprises communication interface for connection to the network and the media gateway.

The description of the system and the proposed methods and algorithms are detailed as follows. First the WLAN network architecture is described with the connection to the multicast media delivery. Then the collection of the receiving capability information is presented with respect to: I) how to detect and signal this information, II) how to accomplish the initial probing phase and the secondary probes, III) how to store the receiving capability information and the properties of the media. Subsequently, a method is proposed to tell the AP's which data rate to apply for given data packets. Then the data and signalling messages are summarized and illustrated. Afterwards, optimizing algorithms are planned to calculate the optimal data rate for each layer based on different objectives for the user perceived quality maximization. Finally, the advantages of the invention are summarized.

A typical network scenario of the multicast layered media distribution in WLAN access networks is described in the following example.

FIG. 3A further depicts an example of network architecture according to the present invention. There are three main parts of the network: the first is a sender part 301 with a Media Server 304. The second is a Multicast Backbone (MB) 302 connecting a third part: an Access Network 303 and the Media Server 304 via a Media Gateway (MG) 306 and via a Rendezvous Point (RP) router 305, respectively. The third part, the Access Network 303 comprises Access Points (AP) 307, 308 and user stations 309, 310. In the MB 302, a multicast tree is defined between the media server 304 and MGs 306. The root of the multicast tree is either the Media Server 304 of the RP router 305, the leaves of this tree are the MGs 306.

Figure 3B:
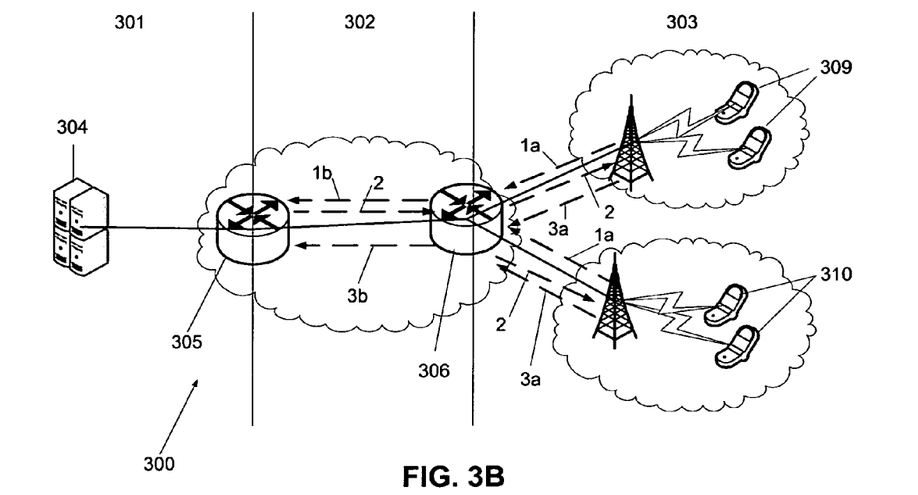

Several multicast groups can be defined for different kind of media to be distributed and each multicast group is associated with a multicast tree. To manage signing up to or leaving a specific multicast group, Internet Group Management Protocol (IGMP), e.g., IGMPv2 (version 2) can be used. For signing up to a multicast group the user sends an IGMP Membership Report message to the MG 306. Leaving is signalled by an IGMP Leave message. The MG 306 forwards these messages to the multicast tree upstream towards the sender 304 of the media as Join or Prune messages, respectively. In FIG. 3B a signalling scheme is illustrated. Note, that in FIG. 3B the communication for the media delivery is illustrated only from the MG point of view:

1a. A membership report is sent from the users 309, 310 to the Media Gateway 306;
1b. A join message is sent to the RP router 305;
2. Media is streaming from the Media Server 304 to the users 309, 310;
3a. Leave messages are sent from the users 309, 310 to the Media Gateway 306; and
3b. Prune messages are sent from the Media Gateway 306 to the RP router 305.

The MG is the last node, which has detailed information about the layered structure of the media and is "directly connected" to the AP's, which set the data rate of the packets. So MG is the best place to control the bandwidth utilization and run an optimizing algorithm.

The WLAN standards use different modulation types for data delivery. These modulation types correspond to different data rates. To optimize the user perceived quality, the exact knowledge of the current receiving capabilities of the users per AP is needed, i.e., how many users can receive each data rate. As in current WLAN standards no receiving capability reporting is used (in case of multicast traffic), some novel extensions in the architecture must be considered. After introducing the technical background of how to detect the receiving capability, a protocol extension is proposed to signal this information. Then the way how to collect this information is described. The collected information should be stored in the MG, thus two essential database (register) formats are presented for this purpose.

In WLAN, the Physical Layer Convergence Protocol (PLCP) headers of each packet are sent out at the lowest possible bit rate in order to ensure that all stations are capable of receiving the headers. The rest of the packet (practically the payload) is sent out, however, at the highest possible data rate permitted by the user's current receiving capabilities in case of unicast traffic.

The Payload Signaling Field (PSF) in the PLCP header indicates the rate used for the payload. Thus, based upon this information, each user can determine the highest data rate that the user is able to receive. If the receiving capability of a user is changed, then a receiving capability update report is sent by the user. This trigger based solution is applicable if the radio conditions are stable or change slowly. However, if the radio conditions change rapidly, then a periodic receiving capability update could result less signaling overhead.

Receiving capability signaling can be handled by IGMPv2. For such purpose a new message type should be defined, the IGMPv2 Receiving Capability Update message (IGMP-RCU). Table 1 shows an exemplary proposed IGMP-RCU message format.

1 Receiving an IGMP-RCU message for a specific group that contains 0 for the Old Rate indicates that a new user has joined the group. The MG adds the user to the Receiving Capability Table. In order to be consistent, a 0 for the New Rate can mean that a user leaved the group, so the user can be deleted from the Receiving Capability Table.

2 In order to avoid lost IGMP-RCU messages the IGMP-like error protection (doubled messages) can be considered. As the lowest data rate is the most robust and error-tolerant due to the used modulation scheme, it can be used to protect IGMP-RCU messages against accidental bit-errors.

TABLE 1

| 00 01 02 03 04 05 06 07 | 08 09 10 11 12 13 14 15 | 16 17 18 19 20 21 22 23 | 24 25 26 27 28 29 30 31 |
|---|---|---|---|
| Type | Max Response Time | IGMP Checksum | |
| | Group Address | | |
| Old Rate | | New Rate | |

The meaning of the fields is as follows.

Type (8 bits): the first unused value is 0xF0. This could mean an IGMPv2 Receiving Capability Update message.

Max Response Time (8 bits): The users do not use this field and set it to 0. This field is used for indicating the length of the Initial Probing Phase in IGMP-RCU messages sent by the MG to the appropriate multicast group.

IGMP Checksum (16 bits): Used for error protection.

Group Address (32 bits): Multicast group address to which the user is reporting the receiving capability updating. All the nodes signed up to this address ignore the IGMP-RCU messages except the MG. The MG collects information about the current user distribution relevant for each multicast group. Based upon this knowledge, it periodically runs the optimizing algorithm to get the optimal layer distribution for each transmitted stream.

Old Rate (16 bits): Previous data rate that the user can receive before the new data rate. This field allows the protocol to handle 65535 different data rates in the AP (0 is reserved for new entry users without old rate). Since there can be multi-standard capable devices in the network, the ID (number) of a rate should implicitly signal the applied standard by the user, so there is no need for define signaling to tell the MG what kind of standard is used in a given AP. For example, if an AP is both 802.11b and 802.11g capable, then the AP has to be considered as an AP with 12 data rates and Rate #1, . . . , Rate #4 are for 802.11b and Rate #5, . . . , Rate #12 are for 802.11g and let Rate #13, . . . , Rate #65535 used by other technologies.

New Rate (16 bits): New data rate that the user can receive hereafter. This field allows the protocol to handle 65535 different rates in the AP (0 has no sense in this case). Filling in this field follows the same rules as in case of Old Rate.

The first four fields of the proposed IGMP-RCU message format equal to general IGMP messages (like Membership Query, Membership Report or Leave Group). Further fields of IGMP are dedicated to "IGMP payload or future expansion". The new fields of IGMP-RCU (Old Rate and New Rate) can be considered as IGMP payload. The actual content and size of fields above in relation to Table 1 are only examples and may be changed as appreciated by the person skilled in the art. Some further notes may be considered:

Before the distribution of the stream, it is needed to know the initial receiving capability of the users. Therefore, the MG should probe all the data rates for a short packet train. This Initial Probing Phase allows the receivers to detect their exact receiving capability. During Initial Probing Phase all layers are transmitted at all possible data rates (allowed by the available bandwidth). By definition, all users must reply with an IGMP-RCU message after the reception of the first packets of the stream. In this message, there is 0 for the Old Rate indicating that a new user has joined the group.

The MG should indicate the users the beginning and the end of the Initial Probing Phase by a message sent to the appropriate multicast group address. The type of this message can be an IGMPv2 Receiving Capability Update, where the Max Response Time field is used and this field should contain the length of the Initial Probing Phase. As a station receives this message it starts a timer immediately set its expiration to the time-interval contained by the Max Response Time field. Of course, a same timer should be set in the MG. When this timer is expired, the MG can start to send each layer only on the proper data rate and the Initial Probing Phase is finished.

Since there can be data rates, which are not used during the transmission (e.g., no user can receive them in the Initial Probing Phase), these data rates should be checked periodically. Secondary Probes have to be done by sending probe packets at the data rates in question. The probe packets can be dummy packets, their only task is to trigger the users to send IGMP-RCU messages if they can receive new data rates.

Both the media layer information and the user receiving capabilities are stored in MG. An exemplary proposed format of a Media Descriptor Table can be seen in Table 2. The table has to contain the bandwidth requirement of each layer per each media going through the given MG. (Note that the particular $x_1, \ldots x_L, y_1, \ldots, y_L, z_1, \ldots, z_L$ values are derived from the media layer information.)

TABLE 2

| | Bandwidth requirement of layer [kbps] | | | | |
|---|---|---|---|---|---|
| Media ID | 1 | 2 | 3 | . . . | L |
| Media #1 | $x_1$ | $x_2$ | $x_3$ | | $x_L$ |
| Media #2 | $y_1$ | $y_2$ | $y_3$ | | $y_L$ |
| . . . | | | | | |
| Media #M | $z_1$ | $z_2$ | $z_3$ | | $z_L$ |

An exemplary proposed format of Receiving Capability Table can be seen in Table 3. The table has to contain the number of users for each data rate available in the AP per each media going through the given MG. (Note that the particular u(AP,Media,Rate) values are derived from the IGMP-RCU messages.)

TABLE 3

| Basic Service Sets | Available media | Available data rates | Number of users |
|---|---|---|---|
| AP #1 | Media #1 | Rate #1 | u(1, 1, 1) |
|  |  | ... |  |
|  |  | Rate #R | u(1, 1, R) |
|  | ... |  |  |
|  | Media #M | Rate #1 | u(1, M, 1) |
|  |  | ... |  |
|  |  | Rate #R | u(1, M, R) |
| AP #B | Media #1 | Rate #1 | u(B, 1, 1) |
|  |  | ... |  |
|  |  | Rate #R | u(B, 1, R) |
|  | ... |  |  |
|  | Media #M | Rate #1 | u(B, M, 1) |
|  |  | ... |  |
|  |  | Rate #R | u(B, M, R) |

When an optimal layer distribution is calculated (based on the data stored in the Media Descriptor Table and the Receiving Capability Table), the MG can provide information about which data rate should be applied for a particular media packet in a given AP. There are two main possible solutions for this purpose:

1 L2 protocol: a L2 protocol has to be defined to carry the "per-layer-data rate" tuple from the MG to the AP's for each transmitted media.
2 L2 tunnel: a "per-data rate" L2 VLAN "tunnel" can be established between the MG and all AP's.

Clearly, if appropriate other layer protocols and/or tunnels may be used.

One may note that the second approach is less complex, and needs the least complexity add-on to the AP. So VLAN-based L2 tunneling is proposed between the MG and AP's to set the proper data rate for different layers of the media.

In a VLAN-based data rate selection scenario, the task of the AP is media independent. Each data rate is associated with a VLAN between the AP and the MG. Each tunnel transmits only those packets, which should be sent out at the particular data rate associated with the tunnel. After calculating the optimal data rate for all media layers, the MG puts the media packets to the proper VLAN. With this method there is no need to maintain detailed per-media information about the layer distribution in the AP's. The only new feature for an AP is to be able to modulate the packets according to the VLAN ID.

Figure 4:
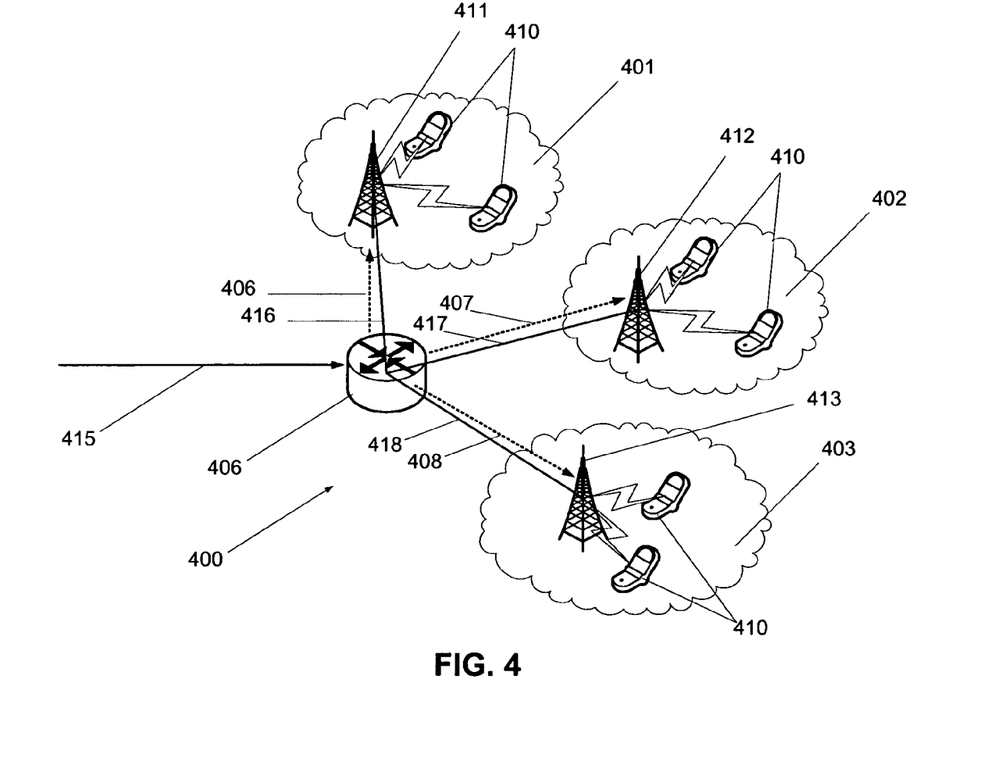
FIG. 4 illustrates schematically an embodiment of VLAN tunnels between the MG and the AP's according to the present invention.

For example, in 802.11b there are 4 and in 802.11g there are 8 different data rates to be used. That is, at most 4+8=12 different VLAN's should be reserved and established between the MG and the AP's for today's technologies. These 12 tunnels occupy only 12 from the possible 4094 VLAN IDs allowed according to the standard protocol. A possible VLAN ID setting for data rate related tunnels can be seen in Table 4 for 802.11b and in Table 5 for 802.11g. An illustration of VLAN tunnels can be seen in FIG. 4, comprising three access network cells 401-403 with each a respective access point 411-413. The access points 411-413 are connected 416-418 to a media gateway 406 receiving 415 streaming data from a media server (not shown). In FIG. 4, for illustrative purposes, access network cells 401 and 402 are 802.11b enabled network cells and access network cell 403 is an 802.11g enabled cell. Media tunnels 406-408 from the media gateway to respective access point 411-413 may be configured as follows using tables 4 and 5: tunnels 406 and 407 may be configured as Tunnel #1b: VLAN 4091 for 1 Mbps, Tunnel #2b: VLAN 4092 for 2 Mbps, Tunnel #3b: VLAN 4093 for 5.5 Mbps and Tunnel #4b: VLAN 4094 for 11 Mbps, while for tunnels 408: Tunnel #1g: VLAN 4083 for 6 Mbps, Tunnel #2g: VLAN 4084 for 9 Mbps, Tunnel #3g: VLAN 4085 for 12 Mbps, Tunnel #4g: VLAN 4086 for 18 Mbps, Tunnel #5g: VLAN 4087 for 24 Mbps, Tunnel #6g: VLAN 4088 for 36 Mbps, Tunnel #7g: VLAN 4089 for 48 Mbps, and Tunnel #8g: VLAN 4090 for 54 Mbps.

TABLE 4

| | 802.11b | | | |
|---|---|---|---|---|
| | 1 Mbps | 2 Mbps | 5.5 Mbps | 11 Mbps |
| VLAN ID | 4091 | 4092 | 4093 | 4094 |

TABLE 5

| | 802.11g | | | | | | | |
|---|---|---|---|---|---|---|---|---|
| | 6 Mbps | 9 Mbps | 12 Mbps | 18 Mbps | 24 Mbps | 36 Mbps | 48 Mbps | 54 Mbps |
| VLAN ID | 4083 | 4084 | 4085 | 4086 | 4087 | 4088 | 4089 | 4090 |

Figure 5:
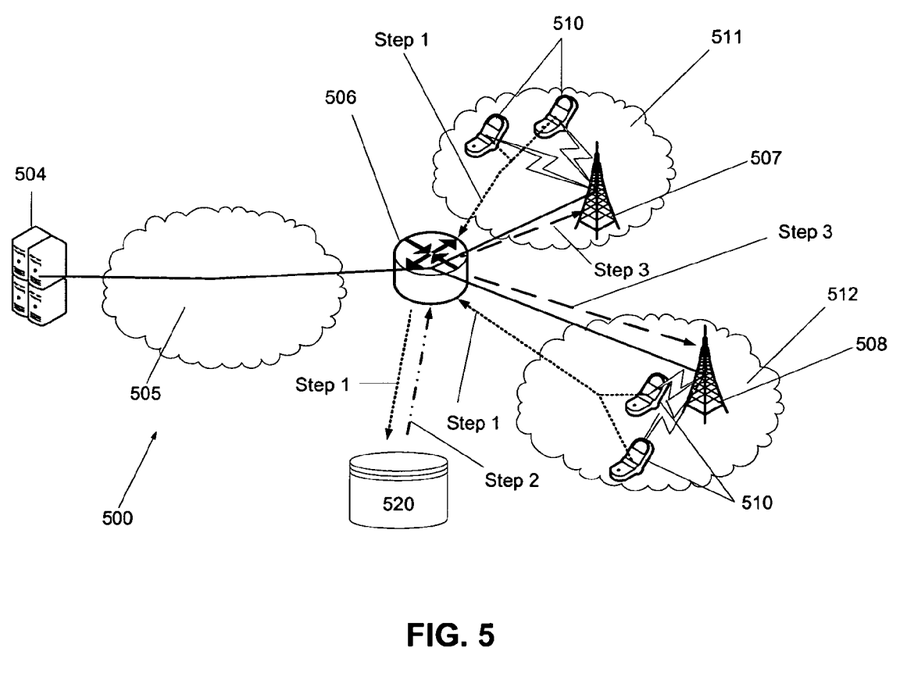
FIG. 5 illustrates schematically communication between network elements during bandwidth optimization according to the present invention.

The communication between the network elements can be seen in FIG. 5 wherein a network 500 according to the present invention is shown with a media server 504 providing data to be streamed to users 510. The streaming data is forwarded in intermediate network and network elements 505 to the media gateway (MG) 506 which is in communicative connection with a database 520 (or registers) with stored IGMP-RCU messages (i.e. with data rates available for each user). The MG 506 is also in communicative connection with access points 507, 508, each access point serving an access network cell 511, 512 with wireless interconnectivity.

A short summary of the present invention in relation to FIG. 5 may be illustrated with the following steps:

1 The MG 506 collects information about the receiving capabilities of the users 510 per AP 507, 508.

The users 510 send the available data rates to the MG 506 in IGMP Receiving Capability Update (IGMP-RCU) messages.

The MG 506 should track on per stream the receiving capabilities of the users 510 per AP 507, 508.

Since the MG 506 is the supervisor IGMP-aware router of the subnet, thus the users directly send the IGMP-RCU messages to the MG 506 which stores the IGMP-RCU messages in the database 520.

2 The MG 506 computes the optimal data rate of the media layers for each AP 507, 508 based on the receiving capabilities of the users 510 and the layer information of the media.

If the cross-layer information about the layer of the packets can be carried in the IP header, then the MG 506 is the obvious network element for processing this information.

3 The MG 506 tells the AP's 507, 508 which data rate to use for the given packets based on the result of the optimization.

The MG 506 forwards the packets to the appropriate AP's 507, 508 from the media server 504.

4 Go to step 2.

Figure 6:
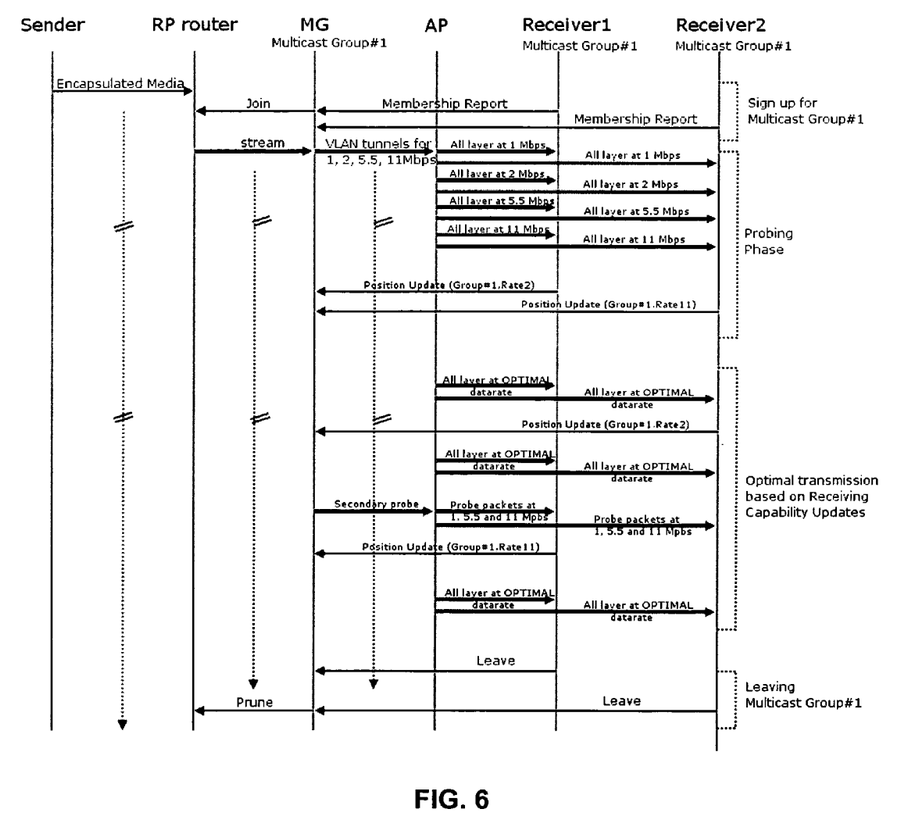
FIG. 6 illustrates schematically an example of data signaling messages in a WLAN 802.11b network according to the present invention.

FIG. 6 shows a detailed example for signaling and data messages in the network architecture. There are one AP in the example with two users subscribing to the same multicast group (i.e., to the same media). The media delivery process (in a wider sense) can be divided into four parts as depicted in FIG. 6:

1 Signing up for a multicast group.

2 The data rate initial probing phase.

3 Optimized transmission based on the receiving capability updates.

4 Leaving the multicast group.

The goal is to maximize the user perceived quality in the network based on the receiving capabilities of the users and the quality properties of the layered media. Algorithmic solutions are given for this optimization task, which algorithms can be implemented in the Media Gateways. These algorithms determine an optimized data rate for each layer of the media.

Two objectives for the maximization based on two possible interpretations of the maximal user perceived quality may be defined.

1 Maximize the average: maximize the average of the user perceived quality in the network. In this case, the layers sent at a given data rate are strongly connected to how many users can receive the given data rate. For this objective, it is shown an optimal algorithm called Max-Avg. This objective provides a network wide optimization of the average user perceived quality. That is, the perceived quality of an individual user may be decreased in order to increase the overall quality in average. Hence, from the users' perspective this service can be thought of as an optimized best-effort multimedia service: the user has to be in the right place to get the right quality.

2 Maximize per rate: maximize the user perceived quality per data rate. In this case, the equality principle is applied for the data rates, which means that the most layers are sent in each data rate independently from how many users can receive the given data rate. (Of course "empty" data rates are omitted, where "empty" means that there is no user for whom this rate is the maximal available.) For this objective, it is shown an optimal algorithm called MaxRate. This objective is more appropriate for "pay-services". Here the perceived quality of individual users is more emphasized instead of optimizing an average quality measure.

In case of all objectives, there is a constraint on the available bandwidth for the multicast media. So the maximization task is to fill the available bandwidth resulting maximal user perceived quality.

In the followings it is shown that the user perceived quality can be considerable higher than in the case of today's media multicasting techniques by providing more efficient channel utilization of the wireless network sending multicast media.

Before detailing the algorithms MaxAvg and MaxRate, the main conceptual differences between the algorithms and prior art are described briefly.

Table 6 shows an artificial example when the quality is in line with the number of layers received at data rates increasing from Rate#1 to Rate#4. Since different amount of data can be sent in a given time frame at different data rates, the channel occupation is a better measure than the bandwidth consumption in wireless environment. To compare the algorithms, the performance of the solutions according to two objectives is investigated:

1 Maximize the average:

$$\text{Quality \#1} = \frac{1}{4}\sum_{i=1}^{4} R_i U_i,$$

where $R_i$ denotes the number of layers can be received at $i^{th}$ and lower data rates (recall the nested properties of the network) and $U_i$ denotes the number of users receiving the $i^{th}$ and lower data rates.

2 Maximize per rate:

$$\text{Quality \#2} = \sum_{i=1}^{4} R_i,$$

where $R_i$ denotes the number of layers can be received at $i^{th}$ and lower data rates (recall the nested properties of the network). Of course "empty" data rates are omitted.

TABLE 6

| | | Algorithm | | | |
|---|---|---|---|---|---|
| | | MaxAvg | MaxRate | Single Rate | Replicated Rate |
| Rate#1 with 1 user | Received layers | 0 | 3 | 3 | 3 |
| | Sent layers | — | $L_1, \ldots, L_3$ | $L_1, \ldots, L_3$ | $L_1, \ldots, L_3$ |
| Rate#2 with 0 user | Received layers | 0 | 3 | 3 | 3 |
| | Sent layers | — | — | — | $L_1, \ldots, L_3$ |
| Rate#3 with 3 users | Received layers | 1 | 4 | 3 | 4 |
| | Sent layers | $L_1$ | $L_4$ | — | $L_1, \ldots, L_4$ |
| Rate#4 with 12 users | Received layers | 10 | 5 | 3 | 5 |
| | Sent layers | $L_2, \ldots, L_{10}$ | $L_5$ | — | $L_1, \ldots, L_5$ |
| Quality | Quality#1 | 30.75 | 18.75 | 12 | 18.75 |
| | Quality#2 | 11 | 15 | 9 | 15 |
| Channel occupation | | ~100% | ~100% | ~66% | ~150% |

The channel occupation of the proposed algorithms is approximately the same, since both of them try to utilize the available time frame considered as 100%. Single Rate cannot utilize such efficiently the available time frame by definition and the quality of the solution is the worst. Replicated Rate would need much more time frame to provide the same quality as MaxRate.

It can be seen, that algorithm MaxAvg (corresponding to Maximize the average objective) provides the best quality for the user receiving Rate#4 (and lower data rates), however, the algorithm omits the users receiving only Rate#1. Algorithm MaxRate (corresponding to Maximize per rate objective)

gives available data rate for everybody, better quality to users receiving Rate#3 (and lower data rates) compared MaxAvg, however, the quality is significantly reduced for users receiving Rate#4 (and lower data rates). Note that both algorithms are the best if it is considered their corresponding objectives.

MaxAvg is set to maximize the average of the user perceived quality in the network by finding the proper data rate for each layer. The nested property of the data rates means that a user in an area with higher available data rates can get all information from lower data rates, so the number of received layers is not less than the layers received in "lower speed" areas: $R_1 \leq R_2 \leq \ldots \leq R_D$ (nested constraint), where D is the number of data rates in the network. So the possible set of the data rates for each layer can be calculated as a combination with repetition, where D elements are chosen from L possible ones (L denotes the number of layers of the media) and one element can be chosen several times.

In an algorithmic formulation, independent solutions have to be compared. The best solution is chosen based on the average user perceived quality in the network: so the calculation of the quality is based on both the layer- and the user distribution of the data rates. Of course, only those solutions can be considered which meet the available bandwidth (channel occupation) constraint. The short summary of the algorithm is as follows.

MaxAvg:

```
START
    Best_Quality = 0
    Best_Layer_Distribution = [0,0,...,0]
For l_1 = 1 to L do
    For l_2 = l_1 to L do
        ...
        For l_D = l_{D-1} to L do
            Calculate_New_Quality({l_1,u_1},{l_2,u_2},...,{l_D,u_D})
            If New_Quality > Best_Quality do
                Best_Quality = New_Quality
                Best_Layer_Distribution = [l_1,l_2,...,l_D]
            End if
        End for
    ...
    End for
End for
END
```

The goal of MaxRate is to maximize the user perceived quality per data rate taking into account the equality principle, which means that the most layers are sent in each data rate independently from how many users can receive the given data rate. The solution of the problem is quite straightforward, namely finding the maximal number of layers to be sent at each rate one after the other independently from how many user can receive the individual data rates. Of course, the amount of available bandwidth (time frame) decreases while heading from one rate to the other. The short summary of the algorithm is as follows.

MaxRate:

```
START
For i = 1 to D do
    Calculate_Max_Layer_For_Rate(i)
    Best_Layer_Distribution =
    [l_1,l_2,...,l_{i-1},Max_Layer_For_Rate,l_{i+1},...l_D]
End for
END
```

It should be noted that even though the present invention has been exemplified above using IEEE 802.11 family of wireless communication, other wireless communication protocols may used, such as, but not limited to IEEE 802.15 and 802.16 families, Bluetooth, Ultra WideBand wireless (UWB), and other wireless communication protocols that has features for varying the communication rate dynamically.

Figure 7:
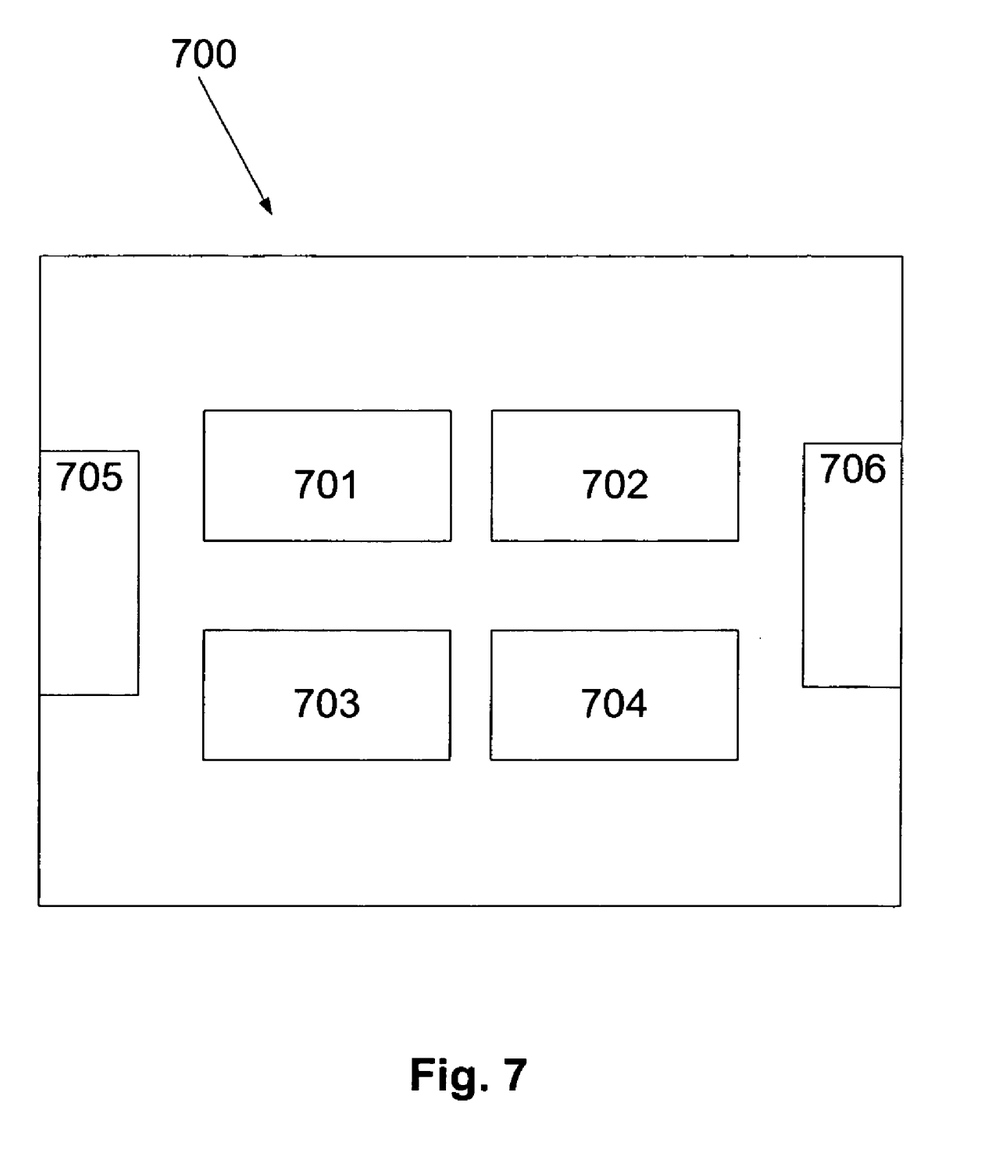
FIG. 7 illustrates schematically in a block diagram a Media Gateway according to the present invention

FIG. 7 illustrates an infrastructure device operating as Media Gateway (MG). This infrastructure device 700 comprises a processing unit 701 that handles control over communication packets and receives data of different user's communication capability. The device 700 may further comprise a memory unit or units, volatile 702 and/or non-volatile 703, for storing control software, statistics, updates, and so on as understood by the person skilled in the art. The memory units may comprise any suitable type including but not limited to: RAM, SRAM (Static RAM) or DRAM (Dynamic RAM) (e.g. DIMM RAM versions, RDRAM, Rambus), diskette, CD-ROM (Compact Disk-Read Only Memory), DVD (Digital Video Disk), flash or similar memory media (e.g. compactflash, SD secure digital, memorystick, miniSD, MMC multimediacard, smartmedia, transflash, XD), HD-DVD (High Definition DVD), or Bluray DVD, USB (Universal Serial Bus) based memory media, magnetic tape media, optical storage media, magneto-optical media, bubble memory. The infrastructure device 700 may further comprise an interface unit 704 for interfacing with a user or operator during installation, maintenance, or operation of the device. The device 700 may further comprise two communication interfaces (which can be using the same physical interface (e.g. Ethernet or ATM) or separate physical interfaces) 705, 706: one for communication towards the access networks and one towards other infrastructure network devices. The infrastructure device 700 is arranged to receive information from the user stations about their rate capacity and sort data packets destined to user stations in respective rate tunnels as described earlier in this document.

An infrastructure system may be set up comprising a media gateway 306, an RP router 305, at least one access point 307, 308 and communication channels 314-316 there between where the media gateway is arranged as to operate the optimization of layered media as set out in the present invention.

Other important advantages of the Invention are as follows:
  The properties of the layered media can be utilized in order to maximize the user perceived quality and efficiently utilize the available bandwidth.
  The actual receiving capabilities of wireless users can be queried and used for optimized layered media transmission or for any other "services" as well.
  The WLAN Access Point can be told which data rate to use for a given data packet based on the proposed VLAN based rate selection.
  The proposed techniques and methods have low complexity and can be implemented in a relatively simple way.
  The present invention may be implemented without changing current WLAN standards to report receiving capability information and process this information, instead the invention use a specific IGMP message to report this information to the Media Gateway (handling the multicast groups), where the optimization process requires only software upgrade which can easily be done.
  Moreover, the invention may be implemented as software or hardware.

It should be noted that the use of the wording access point do not limit the invention, but it should be understood by the person skilled in the art that any type of wireless access gateway communicating with user stations and an infrastructure network can be meant. Also the term user station in this document should be understood as being any type of device communicating wirelessly with an access point (or similar device), user stations may include but is not limited to, mobile phones, personal digital assistants (PDA), laptops, desktop computers, workstations, media receivers (e.g. for broadband data communication or video broadcasting) or similar devices for receiving data in multicast applications.

It should further be noted that the word "comprising" does not exclude the presence of other elements or steps than those listed and the words "a" or "an" preceding an element do not exclude the presence of a plurality of such elements. It should further be noted that any reference signs do not limit the scope of the claims, that at least parts of the invention may be implemented by means of both hardware and software, and that several "means", "units" and "devices" may be represented by the same item of hardware.

The above mentioned and described embodiments are only given as examples and should not be seen to be limiting to the present invention. Other solutions, uses, objectives, and functions within the scope of the invention as claimed in the below described patent claims should be apparent for the person skilled in the art.

ABBREVIATIONS

AAC Advanced Audio Coding
AP Access Point
AVC Advanced Video Coding
BSAC Bit-Sliced Arithmetic Coding
ID Identifier
IEEE Institute of Electrical and Electronics Engineers
IGMP Internet Group Management Protocol
IGMP-RCU IGMP Receiving Capability Update
IP Internet Protocol
L2 Layer 2
LID Layer Independent Descriptor
MB Multicast Backbone
MG Media Gateway
MPEG Moving Picture Experts Group
PLCP Physical Layer Convergence Protocol
PSF Payload Signalling Field
RP Rendezvous Point
VLAN Virtual Local Area Network
WLAN Wireless Local Area Network

The invention claimed is:

1. A method for optimizing data rates when communicating multicast data in a wireless communications network, the method comprising the steps of:
    obtaining by a media gateway, available data rates for multicast data corresponding to a plurality of user stations;
    computing by the media gateway, an optimal data rate for each user station; and
    controlling by the media gateway, the data rate for each data packet of multicast data at each access network cell for each user station by sorting data packets for each user station into rate tunnels, wherein the sorting step includes:
        establishing a plurality of Virtual Local Area Networks (VLANs) between the media gateway and a plurality of access points serving the plurality of user stations, wherein each VLAN operates as a VLAN tunnel providing a different data rate, and each VLAN tunnel transmits only packets that should be sent out at a particular data rate associated with the VLAN tunnel; and
        associating by the media gateway, packets to the proper VLAN for each user station.

2. The method according to claim 1, wherein said multicast data is layered data.

3. The method according to claim 2, further comprising the steps of:
    collecting by the media gateway, information about receiving capabilities of the user stations per network cell;
    computing by the media gateway, an optimal data rate of media layers for each cell based on the receiving capabilities of the user stations and layer information of said media; and
    providing by the media gateway, an optimal data rate for each cell to use for transmitting given packets.

4. The method according to claim 1, further comprising updating said available data rates.

5. The method according to claim 4, wherein said updating is performed through a secondary collection of receiving capabilities of the user stations.

6. The method according to claim 1, wherein the step of obtaining available data rates comprises probing substantially all the data rates by transmitting a short packet train to each user station at an unused data rate, and detecting the capability of each user station to receive at the unused data rate.

7. The method according to claim 1, further comprising the step of maximizing a user-perceived quality per data rate taking into account that most layers are sent in each data rate independently from the number of users receiving the given data rate by finding the maximal number of layers to be sent at each rate one after the other independently from the number of users receiving the individual data rates.

8. A method for optimizing data rates when communicating multicast data in a wireless communications network, the method comprising the steps of:
    obtaining available data rates for multicast data corresponding to at least one user station;
    computing an optimal data rate for each user station;
    controlling the data rate for each data packet of multicast data at each access network cell for each user station by sorting data packets for each user station into rate tunnels; and
    maximizing an average user-perceived quality in a network by finding a data rate for each layer such that a user in an area with higher available data rates receives all information from lower data rates, so the number of received layers, R, is not less than the layers received in lower speed areas: $R_1 \leq R_2 \leq \ldots \leq R_D$, where D is the number of data rates in the network and a possible set of the data rates for each layer is calculated as a combination with repetition, where D elements are chosen from L possible ones, wherein L is number of layers of the media and one element is chosen several times;
    wherein a data rate is set using at least one of:
        defining a layer protocol to carry a per-layer data rate tuple for each transmitted media; and
        establishing a Virtual Local Area Network (VLAN) tunnel as a per-data rate tunnel.

9. A gateway in a wireless communications network for optimizing data rates when communicating multicast data, for enabling multimedia communication over a multimedia transport protocol, and for forwarding data to at least one user station, said gateway including a processor coupled to a non-transitory memory, wherein when the processor executes computer program instructions stored in the non-transitory memory, the computer program instructions stored in the non-transitory memory cause the gateway to:

receive data packets;
obtain available data rates for multicast data corresponding to at least one user station;
compute an optimal data rate for each user station;
control the data rate for each data packet of multicast data at each access network cell for each user station by sorting data packets for each user station into rate tunnels, wherein each tunnel corresponds to a calculated optimal data rate, wherein a data rate is set by defining a layer protocol to carry a per-layer data rate tuple for each transmitted media; and
maximize an average user-perceived quality in a network by finding a data rate for each layer such that a user in an area with higher available data rates receives all information from lower data rates, so the number of received layers, R, is not less than the layers received in lower speed areas: $R_1 \leq R_2 \leq \ldots \leq R_D$, where D is the number of data rates in the network and a possible set of the data rates for each layer is calculated as a combination with repetition, where D elements are chosen from L possible ones, wherein L is number of layers of the media and one element is chosen several times.

10. The gateway according to claim 9, wherein the gateway is also configured to maximize either an average data rate within an access network cell, or a data rate per user within the access network cell.

11. The gateway according to claim 9, wherein the gateway is configured to obtain the available data rates by receiving an Internet Group Management Protocol (IGMP) message.

12. The gateway according to claim 9, wherein the gateway is communicatively connected to a data storing arrangement with stored data rates available for each user.

13. The gateway according to claim 9, wherein the gateway is also configured to collect information about the receiving capabilities of user stations per access point.

14. The gateway according to claim 13, wherein the gateway is also configured to calculate an optimal data rate of media layers for each access point based on the receiving capabilities of said user stations and an information layer of the media.

15. The gateway according to claim 14, wherein the gateway is also configured to send to the access points, a data rate to be used for given packets based on a result of said calculation.

16. A non-transitory computer-readable medium encoded with a computer program product for enabling multimedia communication over a multimedia transport protocol and for forwarding data to at least one user station, wherein the computer program product performs the following steps when run on a processor of a gateway:
obtaining available data rates for multicast data corresponding to a plurality of user stations;
computing an optimal data rate for each user station;
computing an optimal data rate within each access network cell; and
controlling the data rate for each data packet of multicast data at each access network cell for each user station by sorting data packets for each user station into rate tunnels, wherein the sorting step includes:
establishing a plurality of Virtual Local Area Networks (VLANs) between the media gateway and a plurality of access points serving the plurality of user stations, wherein each VLAN operates as a VLAN tunnel providing a different data rate, and each VLAN tunnel transmits only packets that should be sent out at a particular data rate associated with the VLAN tunnel; and
associating packets to the proper VLAN for each user station.

17. A gateway in a wireless communications network for optimizing data rates when communicating multicast data, for enabling multimedia communication over a multimedia transport protocol, and for forwarding data to a plurality of user stations, said gateway including a processor coupled to a non-transitory memory, wherein when the processor executes computer program instructions stored in the non-transitory memory, the computer program instructions stored in the non-transitory memory cause the gateway to:
obtain available data rates for the multicast data corresponding to the plurality of user stations;
compute an optimal data rate for each user station; and
control the data rate for each data packet of multicast data at each access network cell for each user station by sorting data packets for each user station into rate tunnels, wherein the gateway is configured to sort the data packets by:
establishing a plurality of Virtual Local Area Networks (VLANs) between the media gateway and a plurality of access points serving the plurality of user stations, wherein each VLAN operates as a VLAN tunnel providing a different data rate, and each VLAN tunnel transmits only packets that should be sent out at a particular data rate associated with the VLAN tunnel; and
associating packets to the proper VLAN for each user station.

* * * * *